July 3, 1945.   E. DODSON   2,379,692
FLUID PRESSURE OPERATED MEANS FOR CONTROLLING
APPARATUS AT A DISTANCE
Filed April 22, 1944
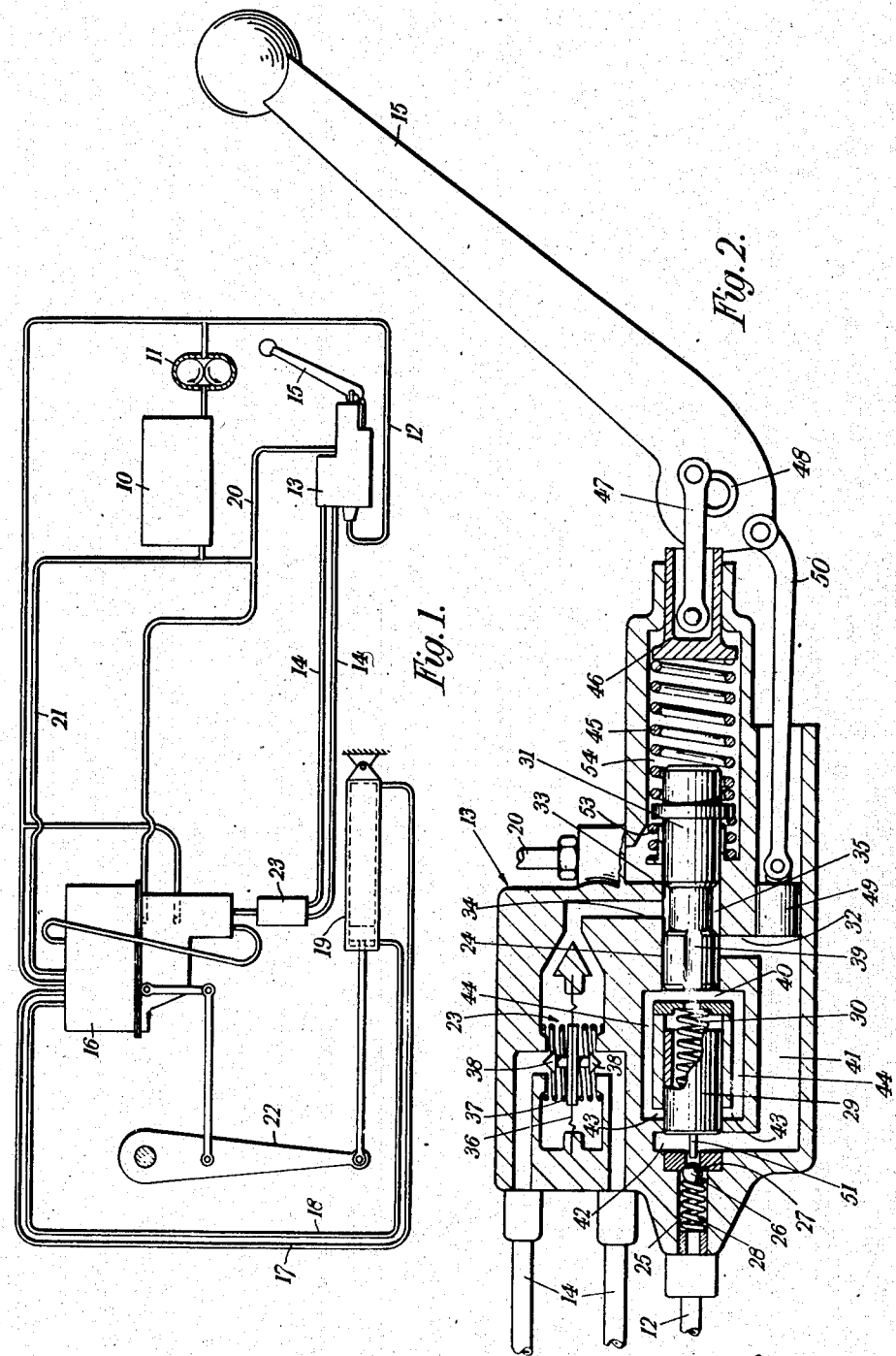
Inventor
Edward Dodson
By Meada, Nolte, Crew & Berg
Attys Patented July 3, 1945

2,379,692

UNITED STATES PATENT OFFICE 2,379,692

FLUID-PRESSURE-OPERATED MEANS FOR CONTROLLING APPARATUS AT A DISTANCE

Edward Dodson, Puriton, near Bridgwater, England

Application April 22, 1944, Serial No. 532,314
In Great Britain January 6, 1944

7 Claims. (Cl. 303—54)

This invention relates to a sender unit for a hydraulic remote control system of the kind, described for example in United States Application Serial No. 431,344, now Patent No. 2,344,768, dated March 21, 1944, comprising a cylinder having an inlet and exhaust ports, an outlet for connection to a signal line leading to a distant receiver unit, a piston valve in the cylinder, exposed at one end to the pressure of the outlet and at the other end to the pressure of a balancing spring and operable, by movement in opposite directions from a neutral position, to place the outlet in communication with the inlet port and with the exhaust port respectively, and an operating member for varying the load on the balancing spring and thereby displacing the valve in the direction to produce a counter-balancing change of pressure at the outlet.

It is desirable to use very high hydraulic pressures, i. e., pressures up to 1000 lbs. per sq. in. or higher on aircraft because of the resultant saving in weight and size of the conduits and of the jacks, and other mechanisms to be operated by the fluid pressure. If, however, pressure fluid tapped from such a high pressure source is fed to the inlet port of a sender unit of the above type difficulties are to be expected from the phenomenon known as "hydraulic lock."

While a balanced piston valve may be perfectly free when exposed to these high pressures and kept moving, if it is allowed to remain stationary for a short period it requires a great effort to move it again. It appears as if the valve does not remain central in its cylinder, and that when it gets to one side the whole of the pressure is exerted in forcing it against that side; and curiously when the pressure is relieved it takes an appreciable time before the valve becomes free again.

With the object of avoiding difficulties due to sticking of the valve, the invention provides a sender unit of the above kind, in which the inlet port is subject to reduced pressure derived from the high pressure by means of a pressure-reducing valve arranged to maintain the pressure at the inlet port in excess of that at the outlet by a predetermined fixed amount. Thus in a typical case the supply pressure may be between 300 and 1000 lbs./sq. in., the signal line pressure at a value from 65–200 lbs./sq. in., according to the position of the operating member, and the reduced pressure 50 lbs./sq. in. in excess of the prevailing signal line pressure. As hereinafter explained, there will be transitory variations in the pressure difference between the inlet port and the outlet while the sender unit is operating to change the pressure in the signal line to correspond with an adjustment in the position of the operating member. By the expression "fixed amount" I mean that the pressure difference between the inlet port and the outlet will be a constant one under steady conditions for all positions of the operating member.

In one arrangement according to the invention, the sender unit comprises a high pressure inlet, a conduit connecting the inlet and the inlet port in the cylinder, a non-return valve controlling communication between the inlet and the conduit, and a spring-loaded piston exposed at the spring loaded end to the outlet pressure and at the other end to the pressure in the conduit, said piston being arranged to open the non-return valve when the difference between the conduit and outlet pressures falls below the pressure of said spring.

The operating member may conveniently be constituted by a pivoted lever and it is preferred to provide in the conduit a plunger linked to the lever and arranged to balance the reaction on the lever of the pressure exerted by the balancing spring.

One specific embodiment of the invention will now be described in greater detail, by way of example, with reference to the accompanying drawing, in which—

Fig. 1 is a diagrammatic showing of the layout of a hydraulic remote control system for actuating the flying control of an aircraft, Fig. 2 is a vertical section through the sender unit.

The hydraulic remote control system shown in Fig. 1, comprises a reservoir 10 to contain oil, a pump 11 serving to feed oil via a pipe 12 to a sender unit 13, a duplicated signal line 14 leading from the sender unit (which is in the cockpit and operated by a pilot's lever 15) to a receiver unit 16, pipes 17 and 18 leading respectively from the receiver unit to opposite ends of a hydraulic jack 19, and pipes 20, 21 serving respectively for return of the oil from the sender and receiver units to the tank. The construction of the receiver unit is fully described in m y copending U. S. application Serial No. 532,311. It operates, by hydraulic pressure received through the duplicated pipe line 14 to adjust the position of the jack 19, and therefore of a lever 22 for actuating the flying control (not shown), to conform with the position of the pilot's lever 15. At each end of the duplicated signal line 14 is a cut-out valve 23, the cut-out valve 23 associated with the sender unit being located in the body thereof as later described. The cut-out valves 23 serve, in the event of damage to or leakage from one of the duplicated pipes 14, to seal off the damaged or leaking pipe while allowing of continued communication between the sender and receiver units via the other pipe.

The sender unit (see Fig. 2) comprises a casting in which is formed a cylinder 24. This communicates at its front end with an inlet 25 communicating with the high pressure hydraulic supply line 12. In the inlet 25 is mounted a non-return valve 26 which is normally held on its seating 27 by a spring 28. Immediately to the rear of the inlet, and at the forward end of the cylinder 24, is a hollow piston 29, containing a spring 30 which urges the piston forwards (i. e., to the left in Fig. 2). To the rear of the piston 29 is a piston valve 31 of the two land type controlling an inlet port 32, an exhaust port 33, and giving access to an outlet 34 from its waisted portion 35. The exhaust port 33 communicates with the return line 20 to the tank while the outlet 34 communicates with the duplicated pipe line 14 through the agency of the cut-off valve 23, above referred to. This comprises a diaphragm 36, loaded at each side by a spring 37 and carrying on each side a valve 38. The diaphragm normally occupies the illustrated neutral position, but on failure of the pressure in either section of the signal line 14, the hydraulic pressure on the other side of the diaphragm will overcome the spring 37 and close the valve 38 controlling the flow from the outlet 34 to the affected section of the signal line 14.

The forward land of the piston valve 31 has a channel 39 in it affording communication to the outlet 34 from the space 40 between the forward end of the piston valve 31 and the rear end of the piston 29. A conduit 41 connects the space 42 at the front of the piston 29 with the inlet port 32, and ports 43 in the cylinder near the forward end of the reducing valve communicate by conduits 44 with the outlet 34, these ports 43 being normally closed by the piston 29 as illustrated.

The piston valve 31 is subjected at its rear end to the pressure of a balancing spring 45, the compression of which is variable by means of a plunger 46 linked by a link 47 to the pilot's throttle lever 15, which is mounted on a pivot 48. A second spring 53 acts to urge the piston valve 31 rearwardly in opposition to the balancing spring 45. A balancing plunger 49, subject to the pressure in the conduit 41, is coupled by a link 50 to the pilot's lever 15 and serves, as hereinafter more fully explained, to balance it against the reaction of the balancing spring 45.

The piston 29 is exposed at its left hand end to the pressure in conduit 41 and at its right hand end to the pressure in the outlet passage 34 and to the pressure of spring 30. These pressures normally balance, and spring 30 is such that the pressure in conduit 41 exceeds by 50 lbs./sq. in. the pressure in the outlet passage 34 and signal line 14. The piston 29 and its associated spring 30 therefore operate to maintain in the conduit 41 a reduced pressure at a value 50 lbs./sq. in. in excess of that in the signal line 14. If the pilot moves his lever 15 to increase the compression of the balancing spring 45, the piston valve 31 will move forward to open the inlet port 32, and allow reduced pressure from the conduit 41 to flow into the signal line 14 to increase the signal line pressure, and effect a corresponding movement of a pressure sensitive member at the distant receiver unit 16 which in turn, moves the flying control accordingly through the agency of the jack 19. At the same time, the resulting fall in pressure in the conduit 41 enables the spring 30 of the piston 29, assisted by the pressure in outlet passage 34, to move said piston forward, causing a spigot 51 on it to open the non-return valve 26 and allow high pressure to enter the conduit 41. As soon as the pressure at the outlet 34, acting on the forward end of the piston valve 31 through the channel 39, plus the pressure of spring 53, balances the pressure of the balancing spring 45, the piston valve 31 will return to its neutral position, and as soon as the pressure in the conduit 41 is again 50 lbs./sq. in. in excess of that at the outlet 34, the piston 29 returns rearwardly to its original position allowing the non-return valve 26 to close.

When the pilot's lever is moved to reduce the compression of the balancing spring 45, the piston valve 31 moves to the rear, placing the signal line 14 in communication with the exhaust port 33. It returns to the neutral position as soon as the outlet pressure has dropped to a value such that, when added to the pressure of the spring 53, it is again equal to the new pressure of the balancing spring 45. The pressure in the conduit 41 would soon fall to a value once more 50 lbs./sq. in. in excess of the outlet pressure by leakage to exhaust past the piston valve 31. Clockwise movement of the pilot's lever 15 about its pivot, to reduce the signal line pressure, however involves forward movement of the balancing plunger 49 and the ports 43 serve to get rid of the fluid displaced by this plunger. This is effected by rearward movement of the piston 29, opening the ports 43 and allowing this fluid to escape to exhaust through the conduits 44, channel 39 and the rearwardly displaced piston valve 31. The piston 29 returns to its normal illustrated position, in which it closes the ports 43, when the reduced pressure in the conduit 41 has dropped to a value 50 lbs. in excess of the new signal line pressure.

It will be noted from Fig. 2 that when piston valve 31 is in its neutral position, the waisted portion 35 of said piston valve has its left end substantially coextensive with the edge of inlet port 32, thereby affording a limited amount of leakage through said piston valve as above stated. Such leakage would only be effective to reduce the pressure in conduit 41 to a value 50 lbs./sq. in. in excess of that in the signal line when the pressure in conduit 41 exceeds that value. This is because such fluid as may leak from inlet port 32 to the waisted portion 35 of piston valve 31 flows to exhaust port 33 and is replaced, when the pressure in conduit 41 tends to drop due to such leakage to less than 50 lbs./sq. in. above the signal line pressure, by opening of the ball valve 26.

In the absence of spring 53, the conduit pressure acting on the plunger 49 would be unable to balance the torque exerted on the pilot's lever 15 by the balancing spring 45 in all positions of the pilot's lever, because this conduit pressure would then, under all conditions, be 50 lbs./sq. in. in excess of the loading of the spring 45. The signal line pressure, and therefore the loading of the spring 45, may however vary from 65–200 lbs./sq. in., according to the position of the pilot's lever. If the area of the plunger 49 and the leverage exerted by its link 50 were arranged to effect a balance when the loading of the spring 45 was 65 lbs./sq. in. and the conduit pressure therefore 115 lbs./sq. in., it is clear that there would not be a balance when the loading of spring 45 was 200 lbs./sq. in. and the conduit pressure 250 lbs./sq. in. I obtain a perfect balance for all positions, however, by utilising the spring 53 which is given the same load (in this instance 50 lbs./sq. in.) as the spring 30 associated with the piston 29. In this way the load imposed on the pilot's lever by the link 37 is made equal to that acting on the plunger 49, i. e., outlet pressure plus 50 lbs./sq. in. for all positions of the lever 15.

The space 54 in which the balancing spring 53 is housed is, as shown, connected to the exhaust port 33 and therefore exposed to exhaust back pressure. The effective area of the plunger 46 is made equal to that of the piston valve 31 so that the exhaust back pressure does not destroy the balance of the operating lever. When there is any considerable exhaust back pressure, it of course increases the signal line pressure, together with the conduit pressure. This gives an increased counter-acting torque from the balancing plunger 49 which exactly equalises the increase in thrust on the plunger 46. As explained in my copending U. S. application Serial No. 532,311, the exhaust back pressure also acts on the rear of the sensitive piston of the receiver unit, so that changes in signal line pressure due to variations in exhaust back pressure will not affect the position of said sensitive piston or of the flying control operated by the receiver unit.

There will be no danger of the piston valve 31 sticking, despite the use of the high supply pressure, because the pressure on it will always be only 50 lbs. in excess of the signal line pressure, which will, as above stated, vary from 65–200 lbs./sq. in. according to the position of the pilot's lever 15. Moreover the fluid displaced by the balancing plunger, on movement of the pilot's lever 15 to reduce the signal line pressure, will assist in overcoming any tendency of the piston valve 31 to stick, by exerting a positive pressure on its forward end. The balancing plunger 49 exposed to conduit pressure has been found to provide a perfect balance of the pilot's lever, which requires no appreciable effort to move it, the balance being stabilised by the friction developed by the sealing arrangement (not shown) of the balancing piston in its cylinder.

What I claim as my invention and desire to secure by Letters Patent is:

1. A sender unit for a hydraulic remote control system, adapted for use with a high pressure supply and comprising a cylinder having inlet and exhaust ports and an outlet, a piston valve in the cylinder exposed at one end to the fluid pressure at the outlet and operable by movement in opposite directions from a neutral position to place the outlet in communication with the inlet port and with the exhaust port respectively, a spring for balancing the piston valve against the pressure at the outlet and thereby urging it to the neutral position, an operating member for varying the pressure of the spring for the purpose of displacing the piston valve to raise or lower the pressure at the outlet, an inlet for connection to the high pressure supply, and a pressure reducing valve for subjecting the inlet port to reduced pressure derived from the high pressure at the inlet, and maintaining at said inlet port a reduced pressure which exceeds that at the outlet by a fixed amount.

2. A sender unit for a hydraulic remote control system, adapted for use with a high pressure supply and comprising a cylinder having inlet and exhaust ports and an outlet, a piston valve in the cylinder exposed at one end to the fluid pressure at the outlet and operable by movement in opposite directions from a neutral position to place the outlet in communication with the inlet port and with the exhaust port respectively, a spring for balancing the piston valve against the pressure at the outlet and thereby urging it to the neutral position, an operating member for varying the pressure of the spring for the purpose of displacing the piston valve to raise or lower the pressure at the outlet, an inlet for connection to the high pressure supply, a conduit connecting said high pressure inlet with the inlet port, a non-return valve controlling communication between said inlet and said conduit, a piston subjected at one end to the pressure in said conduit and at the other end to the pressure at the outlet, and a loading spring operating on the end of the reducing valve exposed to outlet pressure, said piston operating to maintain in said conduit a reduced pressure exceeding that at the outlet by the pressure of said loading spring, and serving to open the non-return valve when the difference between the conduit and outlet pressures falls below the pressure of said loading spring.

3. A sender unit as claimed in claim 2, in which the operating member is constituted by a pivoted lever and comprising a plunger exposed to the pressure in the conduit and operatively connected to said lever, said plunger being arranged to balance the reaction thereon of the balancing spring.

4. A sender unit for a hydraulic remote control system, adapted for use with a high pressure hydraulic supply and comprising a cylinder having inlet and exhaust ports, and an outlet, a piston valve in the cylinder exposed at its forward end to the fluid pressure at the outlet and at its rear end to the exhaust port pressure, said piston valve being operable by movement in opposite directions from a neutral position to place the outlet in communication with the inlet port and with the exhaust port respectively, a balancing spring operating on the rear end of said piston valve, a pivoted operating lever for varying the pressure of said spring and thereby displacing the piston valve to vary the pressure at the outlet, an inlet at the forward end of the cylinder for connection to the high pressure supply, a non-return valve for maintaining said inlet normally closed, a conduit connecting the portion of the cylinder immediately in rear of the non-return valve to the inlet port, a piston in the cylinder located in advance of the piston valve and exposed at its forward end to the conduit pressure and at its rear end to the outlet pressure, and a loading spring, operating on the rear end of said piston, the piston maintaining the conduit pressure in excess of the inlet pressure by a fixed amount determined by the pressure of said loading spring and serving to open the non-return valve to increase the conduit pressure, when said excess pressure falls below the pressure of said loading spring.

5. A sender unit as claimed in claim 4, comprising a second spring operating on the piston valve in opposition to its balancing spring, the loading of said second spring being equal to that of the loading spring action on the piston, and a balancing plunger exposed to the pressure in the conduit and linked to the operating lever and serving to balance, in all positions thereof, the reaction exerted thereon by the balancing spring.

6. A sender unit as claimed in claim 4, comprising a port in the cylinder which communicates with the outlet and is normally closed by the piston, and a balancing plunger in the conduit, which plunger is linked to the operating lever and is arranged to move in to the conduit on movement of the lever to reduce the outlet pressure, said piston then operating to open said port to permit of the escape from the conduit of the pressure fluid displaced by the plunger.

7. A sender unit as claimed in claim 4, comprising a second spring operating on the piston valve in opposition to its balancing spring, the loading of said second spring being equal to that of the loading spring acting on the piston, a balancing plunger exposed to the pressure in the conduit and linked to the operating lever and serving to balance, in all positions thereof, the reaction exerted thereon by the balancing spring, and a second plunger, disposed in the rear end of the cylinder and linked to said lever, the second plunger being of the same effective area as the piston valve, and the balancing spring being mounted in compression between said second plunger and the piston valve.

EDWARD DODSON.